United States Patent [19]
Takada et al.

[11] Patent Number: 4,856,710
[45] Date of Patent: Aug. 15, 1989

[54] DUAL AIR CONDITIONER FOR A VEHICLE

[75] Inventors: Yutaka Takada; Koichi Doi; Tsutomu Yamazaki; Yutaka Obata, all of Atsugi, Japan

[73] Assignee: Nissan Motor Company, Limited, Japan

[21] Appl. No.: 543,537

[22] Filed: Oct. 20, 1983

[30] Foreign Application Priority Data

Nov. 5, 1982 [JP] Japan .................. 57-193396

[51] Int. Cl.⁴ ............... F24F 7/00; B60H 1/00
[52] U.S. Cl. .................... 236/13; 236/1 B; 236/91 C; 236/49; 165/43
[58] Field of Search ........ 236/91 F, 91 C, 49, 236/13, 1 B; 165/16, 42, 43, 22; 98/2.01, 2.11; 62/180, 186, 243, 244

[56] References Cited

U.S. PATENT DOCUMENTS

| | | | |
|---|---|---|---|
| 4,382,463 | 5/1983 | Ikebakaro | 165/43 |
| 4,408,712 | 10/1983 | Naganoma et al. | 236/13 |
| 4,417,618 | 11/1983 | Yoshimi et al. | 236/91 C |
| 4,417,688 | 11/1983 | Schnaibel et al. | 236/10 |
| 4,434,932 | 3/1984 | Hara et al. | 236/49 |
| 4,460,036 | 7/1984 | Yoshimi et al. | 165/42 X |
| 4,477,018 | 10/1984 | Rathgeber | 236/49 X |
| 4,482,009 | 11/1984 | Nishimura et al. | 165/43 X |

FOREIGN PATENT DOCUMENTS 0032735 7/1981 European Pat. Off. .
0060463 9/1983 European Pat. Off. .

*Primary Examiner*—Harry D. Tanner
*Attorney, Agent, or Firm*—Lane and Aitken

[57] ABSTRACT

A dual air conditioner having a pair of air conditioning units for front and rear seats within the compartment of a vehicle adjusts the temperatures of air output to the front and rear seats in accordance with the difference between the temperature desired at one of the front and rear seats and a typical temperature sensed within the compartment corrected by a function of the difference between desired temperatures in order to condition the front and rear seats to the respective desired temperatures.

39 Claims, 8 Drawing Sheets

| MODES<br>DOORS | VENT | BILEVEL | HEAT |
|---|---|---|---|
| VENT DOOR | OPEN | OPEN | CLOSED |
| FLOOR DOOR | CLOSED | OPEN | OPEN |

→ DEGREE OF OPENING OF AIR MIX DOOR FOR FRONT SEAT $P_{am1}$

FIG.9

FAN SPEED $V_r$

Hi

Lo $L_o + k_f \, |T_{sr} - T_{if} + k_2(T_{sf} - T_{sr})|$ $O \quad T_{sr} - T_{if} + k_2(T_{sf} - T_{sr})$

FIG.10

FAN SPEED $V_f$

Hi

Lo $L_o + k_f (T_{sf} - T_{if})$ $O \quad T_{sf} - T_{if}$

DUAL AIR CONDITIONER FOR A VEHICLE

BACKGROUND OF THE INVENTION

The present invention relates to an air conditioner which includes a pair of air conditioning units for front and rear seats in the vehicle in order to set the front- and rear-seat environments to corresponding desired temperatures.

Generally, there is a strong desire especially in luxury passenger cars that the front and rear seat air temperatures be controlled so as to be independently selectable. This is, however, not possible using a single air conditioning unit. Thus, conventionally, vehicles have a pair of air conditioning units, one each for the front and rear seats, which are individually controlled. However, since the front- and rear-seat environments are not isolated, the interdependent effects of the two air conditioning units will disturb their independent control functions, resulting in hunting and other unnecessary control fluctuations.

This problem could easily be avoided by providing a partition between the front and rear seats as in limosines. Such a partition allows mutually independent air conditioning for the front and rear seats, but is more expensive.

SUMMARY OF THE INVENTION

According to the present invention, there is provided a dual air conditioner having a pair of air conditioning units, one each for front and rear seat zones within the passenger compartment of a vehicle, wherein the temperatures of air fed to the front and rear seat zones are adjusted in accordance with the difference between the temperature desired in one of the seat zones and a typical temperature sensed within the passenger compartment and in accordance with the difference between the desired temperatures in order to condition the two zones to respective desired temperatures.

DETAILED DESCRIPTION OF THE PREFERRED EMBODIMENTS

Figure 1:
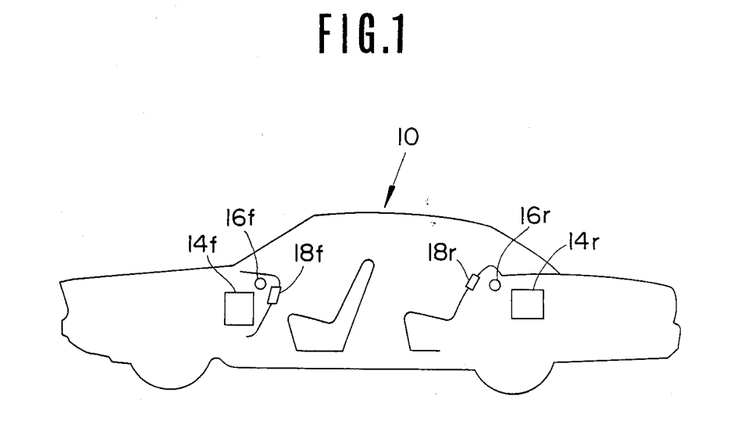
FIG. 1 illustrates a pair of air conditioning units and associated components, according to the present invention, mounted within a vehicle body.

FIG. 1 shows several components of an air conditioner according to the present invention mounted in the vehicle 10. The air conditioner includes a pair of air conditioning units 14f and 14r one each for the front and rear seat zones respectively. The units 14f and 14r receive signals from respective sensors 16f and 16r which sense the temperatures at the front and rear of the vehicle's passenger compartment and control the temperatures there so that the sensed temperatures in these zones match the temperatures set by front and rear temperature setting means 18f and 18r.

Figure 2:
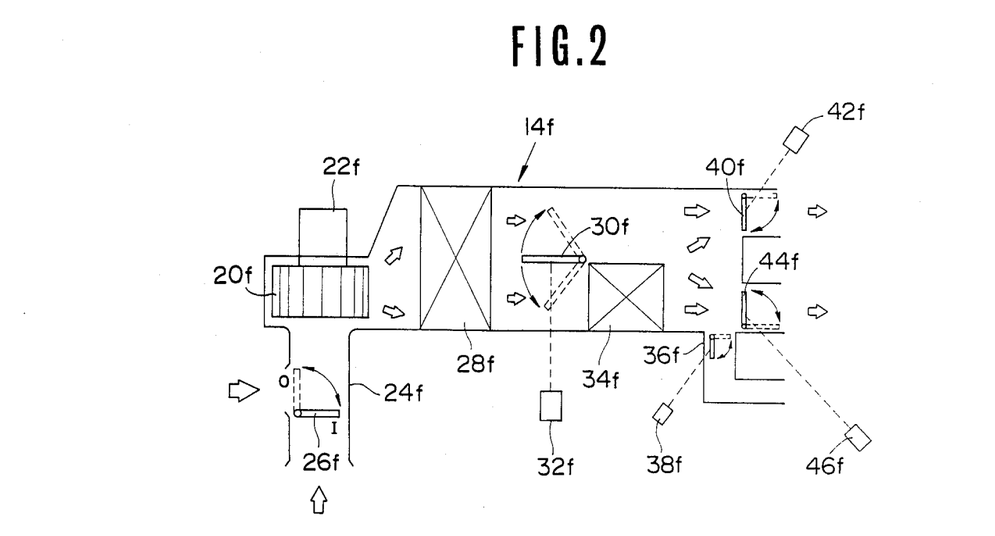
FIG. 2 is a schematic illustration of the air conditioning unit for the front seat of FIG. 1.

FIG. 2 shows the air conditioning unit 14f for the front seat zone in accordance with a preferred embodiment of the present invention. The rear seat air conditioning unit 14r is not shown since it has the same structure as the front seat air conditioning unit 14f. Air is introduced into the air conditioning unit 14f by a fan 20f, the speed of which is controlled by an electric motor 22f, into a duct 24f and flows through an intake door 26f which is switchable between an outside air intake position, shown in solid lines, and an inside air circulating position, shown in broken lines. The introduced air then flows through an evaporator 28f by which the air is cooled, and then through an air mix door 30f, the opening angle of which is controlled by a vacuum actuator 32f. The air mix door 30f controls the access of the cooled air to a heat core 34f. The quantity of cooled air fed via air mix door 30f to the heat core 34f is determined in accordance with the angular position of the door. For example, when the mix door is rotated upwardly, the maximum quantity of cooled air is directed into the heat core 34f whereupon the cooled air is heated. The remainder passes directly into the passenger compartment.

Part of a mixture of the cooled and heated air produced downstream of heat core 34f may pass through a defrost door 36f, the opening and closing of which is controlled by a vacuum actuator 38f. The air passing through the defrost door is used to defrost the front windshield. Some of the mixture is used to warm the front compartment. A vent door 40f is switched by a vacuum actuator 42f to allow or prevent output of the mixture to the front compartment. The remainder of the mixture, passing through a floor door 44f, the opening and closing of which is controlled by a vacuum actuator 46f, can be used to warm the passengers' feet. The above-described structure of the apparatus is substantially the same as the prior art air conditioner mentioned in the introductory portion of this specification.

Figure 3:
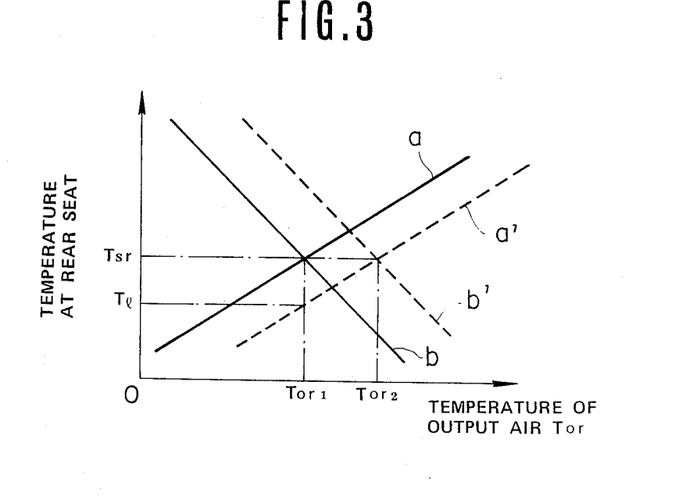
FIGS. 3 and 4 are diagrams illustrating the principle of the present invention.

Before beginning the detailed description of the air conditioner according to the present invention, the basic concept of the present invention will be described, mainly with respect to control of the rear seat temperature with reference to FIG. 3. When the rear seat zone is to be conditioned to a temperature Tsr, and is not influenced by the front seat air conditioning unit, the temperature Tor of air output via the air feed door (not shown) by the rear seat air conditioning unit is derived from the thermal load characteristic a which illustrates that as Tor increases, the temperature Tir of the rear compartment increases, the degree of which depends on the type of the vehicle used, and from the control characteristics b of the rear seat air conditioning unit, which illustrates that as Tir increases, Tor is required to decrease. The output temperature Tor is represented by:

$$Tor = A1 \times Tsr + B1 \times Ta + C1 \times (Tsf - Tif) + D1 \qquad (1)$$

where A1, B1, and C1 are predetermined constants, D1 is the amount of energy of incident sunlight, Ta represents the temperature of the outside air, Tsr the temperature desired at the rear seat, Tsf the temperature desired at the front seat, and Tif the temperature of the front seat compartment or Ti a temperature representative of the entire compartment.

Figure 4:
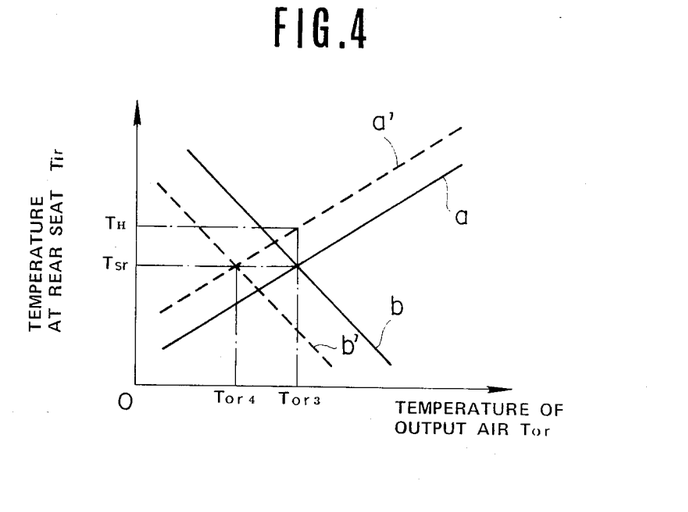

When the influence of the front seat air conditioning unit is considered, for example when the temperature Tof of air fed from the front seat conditioning unit is lower than the set temperature Tsr for the rear seat, the thermal load characteristic is affected as shown by the broken line a'. Thus, the temperature of the rear compartment conditioned with air a temperature of Tor1 will be held at a value Tl which is lower than the actual desired temperature Tsr. On the other hand, when the temperature of air fed from the front seat unit, Tof, is higher than the rear seat desired temperature Tsr, the temperature of the rear seat compartment will be held at a value Th higher than the desired temperature Tsr due to the influence of the air from the front seat unit as shown in FIG. 4, so that the temperature of air fed from the rear seat unit must be adjusted to a value Tor4 lower than Tor3. Thus, in the particular embodiment, the temperature Tor2 of air output by rear seat air conditioning unit to produce the desired temperature Tsr must be calculated using the following formula:

$$Tor = A1 \times Tsr + B1 \times Ta + C1 \times (Tsr - Tif) - C1 \times k \times (Tsf - Tsr) + D1 \quad (2)$$

where k is a constant predetermined for each vehicle and Tsf is the desired temperature at the front seat. It will be clear that the formula (2) includes an additional term $-C1 \times k \times (Tsf - Tsr)$ which is a adjustment term reflecting the shift from the curve a to a'. Thus, the temperature of the rear seat compartment Tir can be accurately adjusted to the desired temperature Tsr. When the influence of the air fed from the front seat unit need not be considered, the value of k of the compensating term should be zero, so that the formula 2 equals the formula 1.

Figure 5:
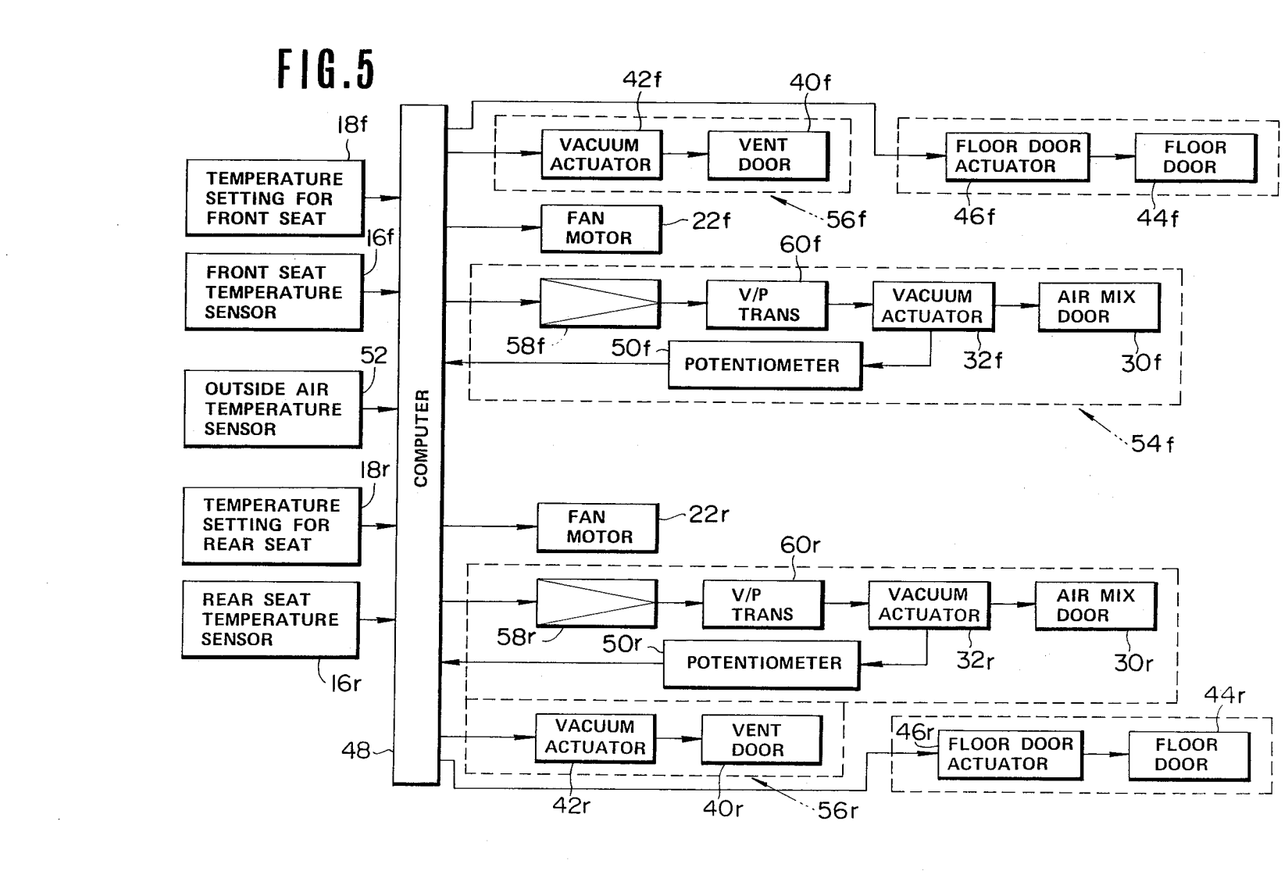
FIG. 5 is a schematic block diagram of a preferred embodiment of an air conditioner according to the present invention.

Referring to FIG. 5, there is shown a schematic diagram of a preferred embodiment of the air conditioner according to the invention. A computing unit 48 performs several calculations on the basis of the signals from the front and rear temperature setting means 18f and 18r, front and rear compartment temperature sensors 16f and 16r, front and rear actuator potentiometers 50f and 50r, and an outside air temperature sensor 52, and outputs the computed results to front and rear air mix door opening control units 54f and 54r, front and rear air output door mode control units 56f and 56r and front and rear fan motors 22f and 22r.

Front air mix door control unit 54f includes an amplifier 58f directly connected to the associated output of computing unit 48, a voltage-to-pressure transducer 60f which is connected to amplifier 58f and which converts the amplified output of computing unit 48 to a corresponding vacuum pressure, a vacuum actuator 32f which determines the opening degree of air mix door 30f in accordance with the vacuum pressure from converter 60f, air mix door 30f, and feedback potentiometer 50f which senses the position of vacuum actuator 32f and provides a signal indicative of the actuator position to computing unit 48. The front unit 54f controls the opening degree of air mix door 30f such that the temperature of air fed from the front unit will match the value calculated in accordance with the following formula:

$$Tof = A2 \times Tsf + B2 \times Ta + C2 \times (Tsf - Tif) + D2 \quad (3)$$

using the signals Tsf, Tif and Ta from front temperature setting means 18f, front compartment temperature sensor 16f and outside air temperature sensor 52. In the formula (3), A2, B2, C2 and D2 are predetermined constants corresponding to A1, B1, C1 and D1 of formulae (1) and (2). In more detail, computing unit 48 calculates the temperature Tof of air output by front unit 54f using the formula (3), and the opening degree Pamf of air mix door 30f, compares the calculated results with the signal FBPf from feedback potentiometer 50f representative of the position of vacuum actuator 32f, and actuates the actuator 32f via amplifier 58f and pressure transducer 60f such that the air mix door 30f assumes the opening degree Pamf calculated.

A rear air-mix door opening control unit 54r has the same structure as the front seat mix door opening control unit 54f, so description thereof will not be repeated. The components of rear air mix door opening control unit 54r can be identified by means of the suffix "r" added to the reference numerals. The temperature of air output by the rear seat unit 54r is calculated using the formula (2).

Front air feed mode control 56f includes a vacuum actuator 42f connected to computing unit 48 and vent door 40f actuated by the actuator 58f, vacuum actuator 46f connected to computing unit 48 and floor door 44f. The opening and closing of vent and floor doors 40f and 44f are controlled via actuators 42f and 46f by computing unit 48 in accordance with the opening degree of air-mix door 30f, as will be described later in more detail. The rear air feed mode control 56r has the same structure as the front air feed mode control, so description thereof will not be repeated.

The formula for calculating the temperatures of air fed toward the front and rear seats has been described above on the basis of the formula (1). However, of course, the temperature of air fed can be determined in accordance with the following simplified formula:

$$Tor = E \times (Tsr - Tif)$$

which is derived by neglecting the terms on the outside air temperature Ta and sunlight energy influence D1 in the formula (1): in other words, in accordance with the difference between the set temperature and the compartment temperature. In the simplified formula, E is a constant.

Figure 6A:
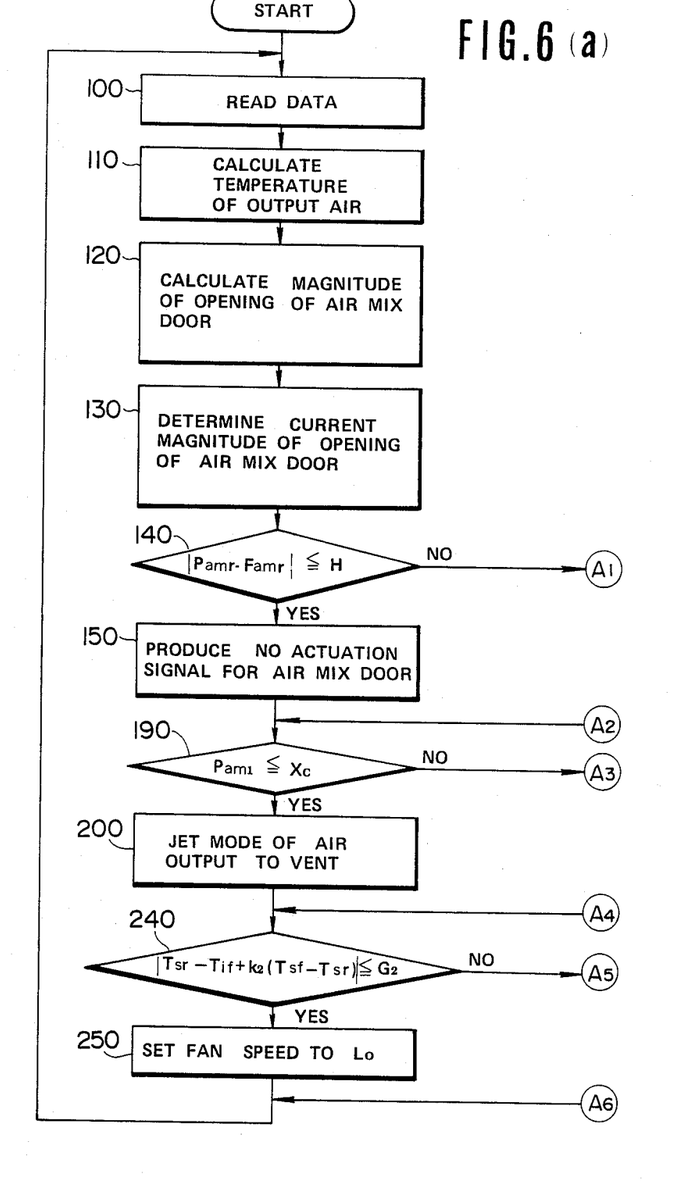
FIGS. 6(a), (b) and 7(a), (b) are flowcharts of a program executed by the computer for controlling the rear and front air conditioning units, respectively.
Figure 6B:
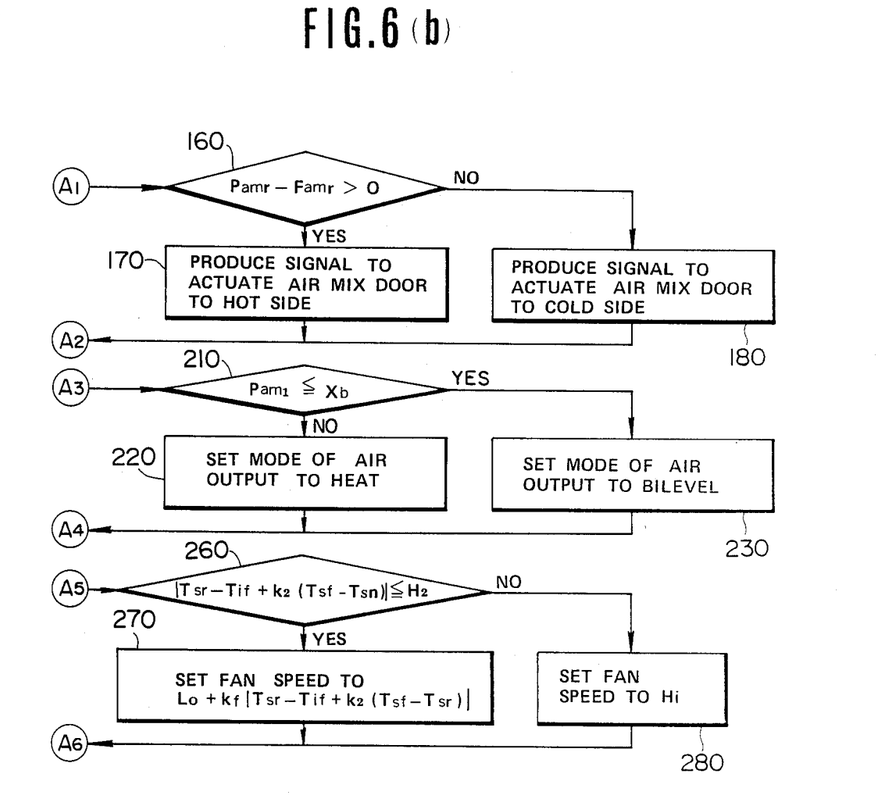
Figure 8:
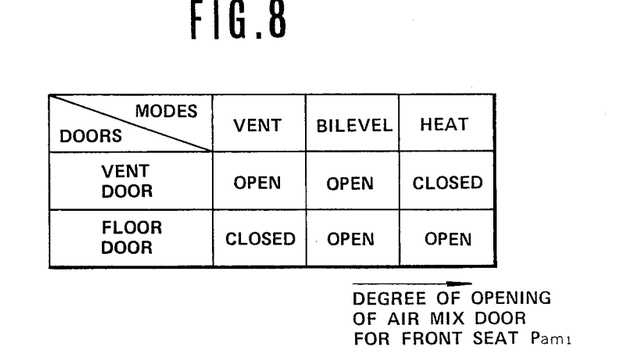
FIG. 8 is a chart showing the relation between the opening degree of an air mix door of the front seat air conditioning unit and the operational modes of the unit.
Figure 9:
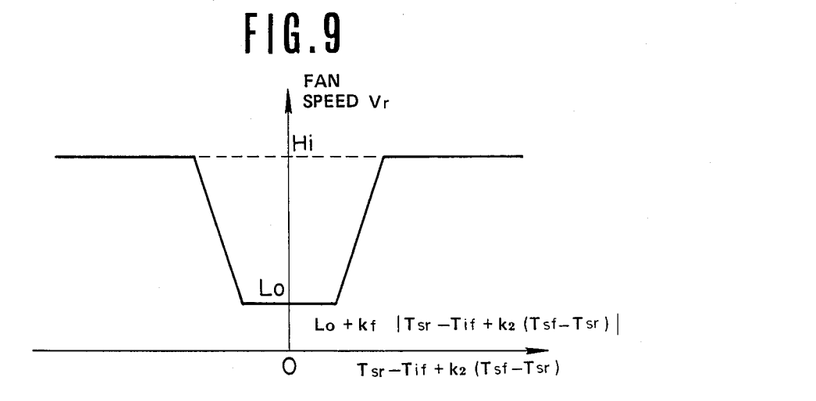
FIGS. 9 and 10 are charts illustrating the control of the speed of the fans used in the front and rear air conditioning units.

The operation of the particular embodiment will be described with reference to FIGS. 6(a), (b) and 7(a), (b). The labels $A_1$–$A_6$ in FIG. 6(a) represent connections to corresponding labels $A_1$–$A_6$ in FIG. 6(b). This also applies to the reference characters $B_1$–$B_6$ in FIGS. 7(a) and 7(b). First, the control of rear air conditioning unit 14r will be described (FIGS. 6(a), (b)). Computing unit 48 reads various necessary data (step 100), calculates the temperature Tor of output air and the opening degree Pamr of air mix door 30r needed to adjust the temperature at the rear seat to the value Tsr (steps 110 and 120). Computing unit 50 recognizes the current opening degree Famr of air mix door 30r and adjusts the opening degree of air mix door 30r in accordance with the difference between Famr and Pamr (steps 130–180). In more detail, if $|Pamr - Famr| \leq A$, which is a constant, then no signal is output to actuate air-mix door 30r, thereby preventing movement of air mix door 30r (steps 140, 150). If Pamr−Famr<0, then a signal to actuate air-mix door 30r to the HOT side is output (steps 160, 170). If Pamr−Famr<0, then a signal to actuate air-mix door 30r to the COLD side is output (step 180). Computing unit 48 then sets the operational mode of rear vent door 40r and floor door 44r to one of the VENT, BI-LEVEL or HEAT modes as shown in FIG. 8 in accordance with the opening degree Pamr of air mix door 30r (steps 190-230). In more detail, if Pamr≦Xc, which is a constant, the rear air feed mode is then set to VENT (steps 190, 200) thereby opening vent door 40r and closing floor door 44r. If Xc<Pamr≦Xb, which is also a constant, then the rear air feed mode is set to BI-LEVEL (steps 210, 220), thereby opening both the vent and floor doors 40r and 44r. If Pamf>Xb, then the mode is set to HEAT (step 230), thereby closing vent door 40r and opening floor door 44r. The computing unit then calculates [Tsr−Tif+k2×(Tsf−Tsr)] where k2 is an adjusting factor predetermined in accordance with the thermal load characteristics peculiar to the vehicle and adjusts rear fan speed Vr in accordance with the calculated results, as shown in FIG. 9 (steps 240-280). In more detail, if |Tsr−Tif+k2(Tsf−Tsr)|≦G2, which is a constant, then rear-fan speed Vr is set to a predetermined value Lo (steps 240, 250). If |Tsr−Tif+k2(Tsf−Tsr)|>H2, which is a predetermined constant, then the rear-fan speed is set to a predetermined value Hi (280). When the rear-fan speed is to be adjusted between the low-speed value Lo and the high-speed value Hi, i.e., if G2<|Tse−Tif+k2(Tsf−Tsr)|≦H2, the following speed Vr should be used:

$$Vr = Lo + Kf|Tsr - Tif + k2 \times (Tsf - Tsr)| \quad (5)$$

where kf is a predetermined constant (steps 260, 270).

Figure 7A:
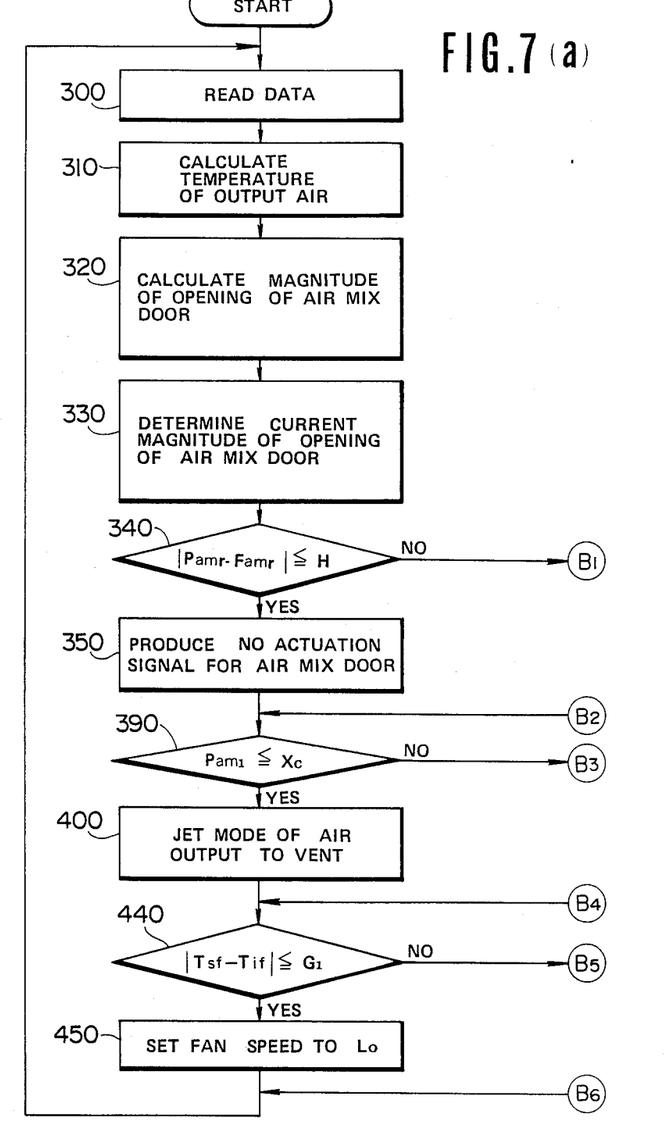
Figure 7B:
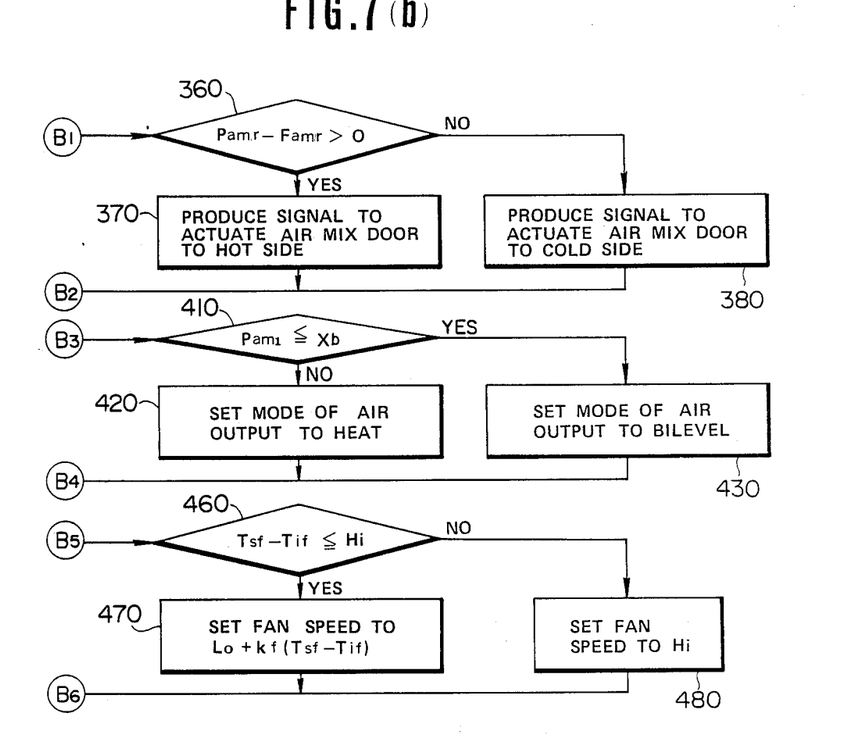
Figure 10:
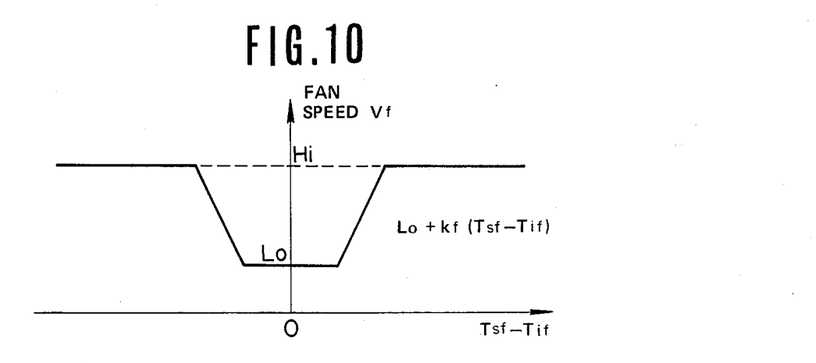

The control of the front unit in steps 300-430 of FIGS. 7(a), (b) is substantially the same as or corresponds to that of the rear unit in steps 100-230 of FIGS. 6(a) and (b). However, control of the front-fan speed Vf is different. Specifically, as shown in FIG. 10, computing unit 48 adjusts the front-fan speed in accordance with the difference between the set temperature Tsf at the front seat and the front compartment temperature Tif (steps 440-480). That is, if |Tsf−Tif|≦G1, which is a predetermined constant, then the front-fan speed is set to Lo (steps 440, 450). If G1<|Tsf−Tif|≦H1, which is a constant, then the fan speed is set to Lo+kf(Tsf−Tif) (steps 460, 470). If |Tsf−Tif|>H1, then the front-fan speed is set to Hi (step 480). That is, when the fan speed is to be adjusted between the low-speed state and the high-speed state, the fan speed value is given by the following formula:

$$Vf = Lo + kf(Tsf - Tif) \quad (6).$$

In the specific embodiment, the temperature Tor of air output to the rear seat only has been described as being adjusted in accordance with the operation of the front unit, mainly due to the assumption that the front seat air conditioning unit has a capacity larger than that of the rear seat air conditioning unit. On the contrary, when the rear seat air conditioning unit has a capacity larger than that of the front seat air conditioning unit, then solely the front seat air conditioning unit may be adjusted. When the front and rear air conditioning units have the same capacity, they may both be adjusted interdependently.

While the compartment temperature sensors have been described to be provided one for each seat and the temperature sensed at the front seat has been used as representing the temperature of the whole compartment, a single sensor may be used.

While the present invention has been described and shown in terms of a preferred embodiment thereof, various change and modifications of the present invention could be made by those skilled in the art without departing from the spirit and scope of the present invention as set forth in the attached claims.

What is claimed is:

1. A method of conditioning the temperatures of air provided to front and rear seats, respectively, within the passenger compartment of a vehicle, comprising the steps of:

selecting a desired air temperature for each seat, respectively;

sensing a typical temperature Ti within said compartment;

calculating a temperature $To = C \times (Ts - Ti) - C \times k \times (Ts - Ts1)$ where C is a constant, and Ts is the temperature desired at a given one of the seats and where k is a constant and Ts1 is a desired temperature in the other seat;

feeding air at the temperature To to said given seat.

2. A method as claimed in claim 1, wherein Ti is a typical air temperature in said given seat.

3. A method of conditioning the temperature of air provided to front and rear seats, respectively, within the passenger compartment of a vehicle, comprising the steps of:

selecting a desired air temperature for each seat, respectively;

sensing the temperature Ta of air outside the vehicle, and a typical temperature Ti of air in the passenger compartment and the amount D of solar energy present in the passenger compartment;

calculating $To = A \times Ts + B \times Ta + C \times (Ts - Ti) \pm D - C \times k \times (Ts - Ts1)$ where A, B and C are constants, and Ts is the desired temperature desired at a given seat; and where k is a constant and Ts1 is a desired temperature in the other seat; and feeding air at the temperature To to said given seat.

4. A method as claimed in claim 3, wherein Ti is a typical air temperature in said given seat.

5. A method of conditioning the temperature of air at front and rear seats, respectively, within the passenger compartment of a vehicle equipped with separate air conditioning units, one for each of the seats, comprising the steps of:

(a) selecting a desired temperature for each seat, respectively, and sensing a typical actual temperature Ti of air within the passenger compartment;

(b) calculating a temperature $To = C \times (Ts - Ti) - C \times k \times (Ts - Ts1)$ where C is a constant, Ts is the temperature desired at a given seat, and where k is a constant and Ts1 is a desired temperature in the other seat;

(c) calculating the magnitude Pam of opening of an air mix door of the air conditioning unit conditioning the air for said given seat to determine proportions of warm and cold air which result in temperature To at the output of respective air conditioner for said given seat;

(d) measuring the current magnitude Fam of opening of said air mix door;

(e) determining the value of Pam−Fam;

(f) actuating the air mix door in accordance with the value determined in said step (e) to move it to a position providing the temperature To at the output of said air conditioner;

(g) determining whether or not Pam≦Xc where Xc is a constant;

(h) controlling the mode of air flow from the air conditioning unit into the vehicle compartment in accordance with the results of the step (g);

(i) determining whether or not a predetermined relationship between the sensed temperature Ti, and the selected temperature for a given seat holds; and (j) driving a fan of the air conditioning unit at a given speed in accordance with the results of the step (i) to feed the mixed air to said given seat at a given rate.

6. A method as set forth in claim 5, further including the steps of sensing the temperature Ta of air outside the vehicle, and the amount D of solar energy incident upon the vehicle compartment, and wherein To further includes at least one of additive adjustment terms A×Ts, B×Ta and D where A and B are constants.

7. A method as set forth in claim 5, wherein when H is a constant and |Pam−Fam|≦H, the mix door is not actuated in said step (f).

8. A method as set forth in claim 5, further including the step of determining whether or not Pam−Fam>0 when H is a constant and |Pam−Fam|>H, and wherein said air mix door is actuated in step (f) so as to increase the proportion of warm air in the mixed air when |Pam−Fam|>H and Pam−Fam>0.

9. A method as set forth in claim 5 further including the step of determining whether or not Pam−Fam>0 when H is a constant and |Pam−Fam|>H, and wherein the air mix door is actuated in said step (f) so as to increase the proportion of cool air in the mixed air when |Pam−Fam|>H and Pam−Fam<0.

10. A method as claimed in claim 5, wherein when Pam<Xc, said step (h) includes setting the mode of air introduction to a VENT mode in which vent and floor doors provided at relatively high and low points at one of said seats are open to allow the mixed air to be fed to said seat and closed, respectively, by this setting.

11. A method as claimed in claim 5, wherein when Xc is a constant, Xb is a constant greater than Xc, Pam>Xc, if Pam≦Xb said controlling step (h) includes setting the mode of air introduction to a BI-LEVEL in which vent and floor doors provided at relatively high and low points at one of said seats are both open to allow the mixed air to be fed to said seat.

12. A method as claimed in claim 5, wherein when Pam>Xc, said controlling step (h) includes setting the mode of air introduction to a HEAT mode in which vent and floor doors provided at relatively high and low points in one of said seats are respectively closed and open to allow the mixed air to be fed to said seat.

13. A method as claimed in claim 5, wherein said predetermined relationship in step (i) is represented by |Tsr−Ti+k2(Tsf−Tsr)|≦G2, wherein Tsr is the desired temperature at a given seat k2 is a constant, Tsf is the desired temperature at the other seat, and G2 is a constant.

14. A method as claimed in claim 13, wherein said predetermined relationship is also represented by |Tsr−Ti+k2(Tsf−Tsr)|≦H2 where H2 is a constant greater than G2, when the predetermined relationship |Tsr−Ti+k2(Tsf−Tsr)|≦G2 does not hold, and wherein when the relationship |Tsr−Ti+k2(Tsf−Tsr)|≦H2 holds, the fan is driven at a speed represented by Lo+kf|Tsr−Ti+k2(Tsf−Tsr)| where Lo is a first predetermined value and kf is a constant.

15. A method as claimed in claim 14, wherein when the relationship |Tsr−Ti+k2(Tsf−Tsr)|>H2 holds, the fan is driven at a second predetermined speed.

16. A method as claimed in claim 5, wherein the predetermined relationship among sensed temperature and desired temperatures in step (i) is represented by |Tsf−Ti|≦G1 where Tsf is the desired air temperature at said given seat, and G1 is a constant, and wherein when the relationship |Tsf−Ti|≦G1 holds, the fan is driven at a first predetermined speed.

17. A method as claimed in claim 16, wherein when |Tsf−Ti|≦H1 where H1 is a constant greater than G1, and |Tsf−Ti|>G1, the fan is driven at a speed represented by Lo+kf(Tsf−Ti) where Lo and kf are constants.

18. A method as claimed in claim 16, wherein when |Tsf−Ti|>H1 where H1 is a constant greater than G1, the fan is driven at a constant speed.

19. A method as claim in claim 5, further including the step of:

(k) repeating steps (c) through (j) inclusive using the other seat of claim 4 as the given seat and the given seat of claim 4 as the other seat.

20. A method as claimed in claim 5, wherein Ti is a typical air temperature in said given seat.

21. An apparatus for conditioning the temperatures of air at the front and rear seats, respectively, within the passenger compartment of a vehicle, comprising:

means for sensing a typical temperature Ti within the compartment;

means for calculating a temperature To=C×(Ts−Ti)−C×k×(Ts−Ts1) where C is a constant, Ts is the desired temperature at a given one of the seats and k is a constant and Ts1 is the desired temperature at the other seat; and a first air conditioning unit for feeding air at the temperature To to said given seat.

22. An apparatus as claimed in claim 21, further comprising:

means for sensing the temperature $T_A$ of air outside the vehicle, and the temperature Ti of air at and the amount D of solar energy present at one of front and rear seats; and wherein said To further includes at least one of the additive terms A×Ts, B×Ta, D, where A and B are constants.

23. An apparatus for conditioning the temperature of air in the front and rear seats, resepctively, within the passenger compartment of a vehicle, said apparatus having two air conditioning units, one for each seat, each unit including an air mix door which controls the proportions of warm and cold air mixed to produce output air comprising:

(a) means for sensing the actual temperature Ti of air near the front and rear seats;

(b) means for (i) calculating an output temperature To=C×(Ts−Ti)−C×k×(Ts−Ts1) where C and k are constants, Ts is the desired temperature at a given one of the front and rear seats and Ts1 is the desired temperature at the other seat;

(ii) calculating the magnitude Pam of opening of the air mix door required to produce output air at the temperature To;

(iii) determining the actual magnitude Fam of the opening of said air mix door;

(iv) determining whether or not $|Pam-Fam| \leq H$ where H is a constant;

(v) determining whether or not $Pam \leq Xc$ where Xc is a constant;

(vi) determining whether or not a predetermined relationship among the desired temperatures of air at the front and rear seats and the sensed temperature Ti holds; and (c) means for actuating the air mix door in accordance with the results determined in (iv) by said calculating means;

(d) means for controlling the mode of air introduction into the vehicle compartment in accordance with the results determined in (v) by said calculating means; and (e) means for driving a fan of the air conditioning unit of the corresponding seat at a speed in accordance with the results determined in (vi) by said calculating means to feed the mixed air to said given seat.

24. An apparatus as set forth in claim 23, further including means for sensing the temperature Ta of air outside the vehicle, and means for sensing the amount D of solar energy incident on the vehicle compartment, and wherein To further includes at least one of additive adjustment terms $A \times Ts$, $B \times Ta$ and D where A and B are constants.

25. An apparatus as set forth in claim 23, wherein said actuating means maintains the air mix door at its position when $|Pam-Fam| \leq H$ where H is a constant.

26. An apparatus as set forth in claim 23, wherein said calculating means further determines whether or not $Pam-Fam>0$, when H is a constant and $|Pam-Fam|>H$, and wherein said actuating means actuates the air mix door so as to increase the proportion of warm air in the output air when $Pam-Fam>0$.

27. An apparatus as set forth in claim 23, wherein said calculating means determines whether or not $Pam-Fam>0$ when H is a constant and $|Pam-Fam|>H$ and wherein said actuating means actuates the air mix door so as to increase the proportion of cold air in the output air when $Pam-Fam<0$.

28. An apparatus as claimed in claim 23, wherein each air conditioning unit further includes vent and floor doors provided at high and low points relative to the respective seats and wherein when Xc is a constant and $Pam<Xc$, said controlling means sets the mode of air introduction to a VENT mode in which the vent and floor doors are open, to allow the mixed air to flow toward the corresponding seat, and closed, respectively, by this setting.

29. An apparatus as claimed in claim 23, wherein each air conditioning unit further includes vent and floor doors provided at high and low points relative to the corresponding one of the front and rear seats and wherein said calculating means determines whether or not $Pam \times Xb$ when Xb is a constant, Xc is a constant smaller than Xb, and $Pam>Xc$, and wherein said controlling means sets the mode of air introduction to a BI-LEVEL mode in which the vent and floor doors are both open to allow the mixed air to toward the respective seats when $Pam \leq Xb$.

30. An apparatus as claimed in claim 23, wherein each air conditioning unit further includes vent and floor doors provided at high and low points relative to the respective seats and wherein said calculating means determines whether or not $Pam \leq Xb$ when Xb is a constant, Xc is a constant smaller than Xb, and $Pam>Xc$, and wherein said controlling means sets the mode of air introduction to a HEAT mode in which the vent and floor doors are closed and open to allow the mixed air to flow toward the respective seats, respectively when $Pam>Xb$ wherein when $Pam<Xc$, said step (h) includes setting the mode of air introduction to a VENT mode in which vent and floor doors provided at relatively high and low points at one of said seats are open to allow the mixed air to be fed to said seat and closed, respectively, by this setting.

31. An apparatus as claimed in claim 23, wherein the predetermined relationship in step (b) (vi) is represented by $Tsr-Ti+k2(Tsf-Tsr) \leq G2$ where Tsr is the desired temperature at the rear seat, Ti is the actual temperature at the front seat, k2 is a constant, Tsf is the desired temperature in a first zone, and G2 is a constant.

32. An apparatus as claimed in claim 23, wherein when the predetermined relationship hold, the corresponding fan is driven at a predetermined speed.

33. An apparatus as claimed in claim 23, wherein said calculating means further determines whether or not the relationship $|Tsr-Ti+k2(Tsf-Tsr)| \leq H2$ where H2 is a constant holds when the predetermined relationship in step (b) (vi) $|Tsr-Ti+k2(Tsf-Tsr)| \leq G2$ where G2 is a constant does not hold.

34. An apparatus as claimed in claim 33, wherein when the relationship $|Tsr-Ti+k2(Tsf-Tsr)| \leq H2$ hold, the corresponding fan is driven at a speed represented by $Lo+kf|Tsr-Tif+k2(Tsf-Tsr)|$ where Lo is a first predetermined value and kf is a constant.

35. An apparatus as claimed in claim 33, wherein when the relationship $|Tsr-Ti+k2(Tsf-Tsr)| > H2$ holds, the corresponding fan is driven at a second predetermined speed.

36. An apparatus as claimed in claim 23, wherein the predetermined relationships in step (b) (vi) are represented by $|Tsf-Ti| \leq G1$ where Tsf is the desired temperature at the front seat, and G1 is a constant.

37. An apparatus as claimed in claim 36, wherein when the relationship $|Ts-Ti| \leq G1$ holds, the fan of the corresponding air conditioning unit is driven at a first predetermined speed.

38. An apparatus as claimed in claim 36, wherein said calculating means further determines whether or not $|Ts-Ti| \leq H1$ holds where H1 is a constant when $|Ts-Ti| > G1$, and wherein the fan of the corresponding air conditioning unit is driven at a speed represented by $Lo+kf(Ts-Ti)$ where Lo and kf are constants when $|Ts-Ti| \leq H1$ holds.

39. An apparatus as claimed in claim 36, wherein said calculating means further determines whether or not $|Ts-Ti| \leq H1$ holds where H1 is a constant when $|Ts-Ti| > G1$, and wherein the fan of the corresponding air conditioning unit is driven at a constant speed when $|Ts-Ti| \leq H1$ does not hold.

* * * * *